(No Model.) 4 Sheets—Sheet 1.

J. P. ROYALL.
ADDING MACHINE.

No. 521,221. Patented June 12, 1894.

Witnesses
J. B. Earle
H. Alber

Inventor
John P. Royall
By his Attorney P. Byrne (No Model.) 4 Sheets—Sheet 2.
J. P. ROYALL.
ADDING MACHINE.

No. 521,221. Patented June 12, 1894.

Witnesses
Inventor
John P. Royall
By his Attorney (No Model.) 4 Sheets—Sheet 3.

J. P. ROYALL.
ADDING MACHINE.

No. 521,221. Patented June 12, 1894.

Witnesses
J. B. Earle
H. Alber

Inventor
John P. Royall
By his Attorney P. Byrne

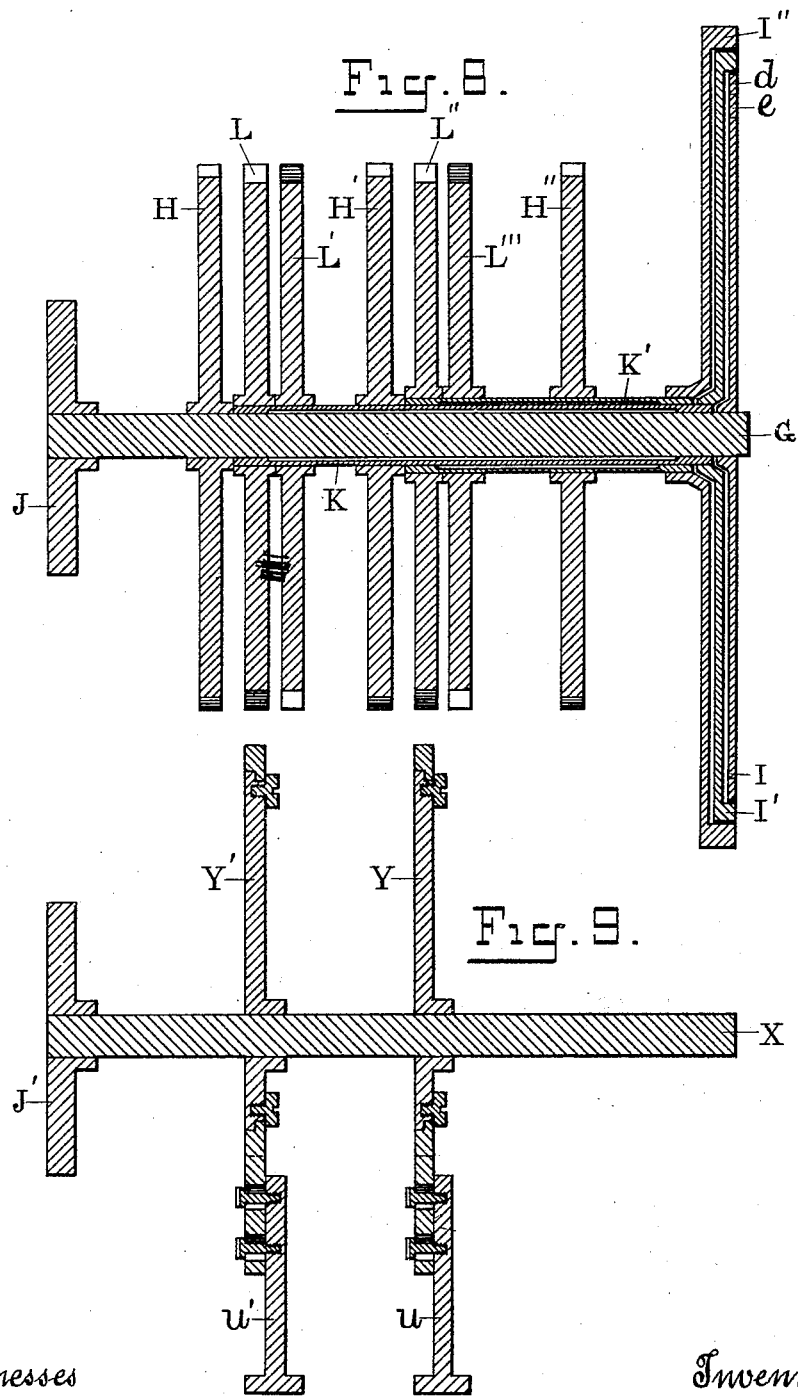

UNITED STATES PATENT OFFICE.

JOHN PRICE ROYALL, OF COLUMBIA, MISSOURI.

ADDING-MACHINE.

SPECIFICATION forming part of Letters Patent No. 521,221, dated June 12, 1894.

Application filed July 24, 1893. Serial No. 481,365. (No model.)

*To all whom it may concern:*

Be it known that I, JOHN PRICE ROYALL, a citizen of the United States, residing at Columbia, in the county of Boone and State of Missouri, have invented certain new and useful Improvements in Adding-Machines; and I do hereby declare the following to be a full, clear, and exact description of the invention, such as will enable others skilled in the art to which it appertains to make and use the same.

My invention relates to improvements in that class of adding machines, in which numbered keys attached to levers, are pressed down by the fingers, to perform the operation of adding up a column of figures; and the objects of my improvements are, first, to provide a machine of this description in which a toothed wheel is mounted on a shaft journaled in the frame, and a series of toothed, and ratchet wheels, is mounted on loose sleeves operating on the shaft, in connection with a numbered index wheel mounted on the end of the shaft, and numbered index wheels mounted on the end of each sleeve, operated by a series of key levers extending to the front of the machine, having numbered keys arranged as a key board; second, to provide suitable connections between the key levers and toothed wheels by which the wheels can be turned one hundredth or nine hundredths of a revolution by the pressing down of one key as the operator may desire, and provide a means of automatically raising the next highest number when necessary in the manner hereinafter more fully described; third, to provide a machine that will be accurate in its result, which may be readily and easily operated, and presents a key board of simple arrangement which can be readily learned, and will operate the enumerative wheels correctly if ordinary care is used to operate the keys; fourth, to provide a machine of the above description, that will be cheap and simple to construct in all its parts, not liable to get out of order and occupying a small space on the desk, can always be kept within reach. I attain these objects by the novel combination of the mechanism, and the arrangement of the different parts, illustrated in the accompanying drawings, in which—

Figure 1:
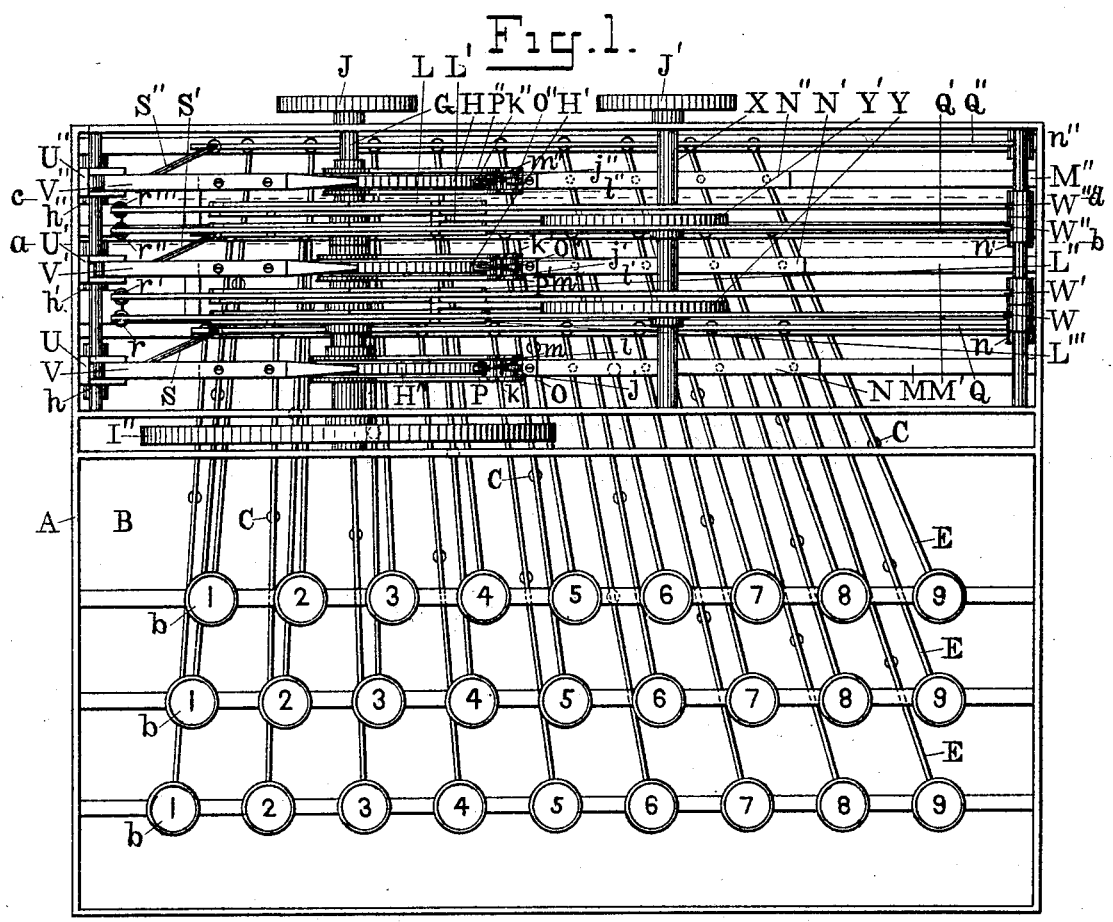
Figure 2:
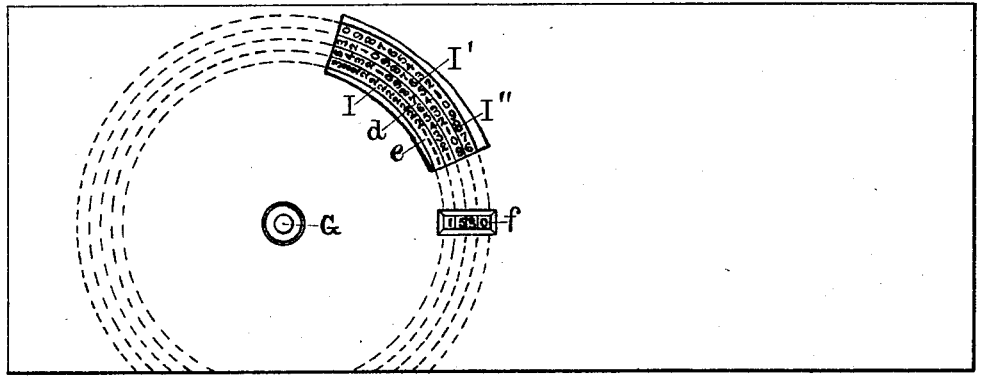
Figure 3:
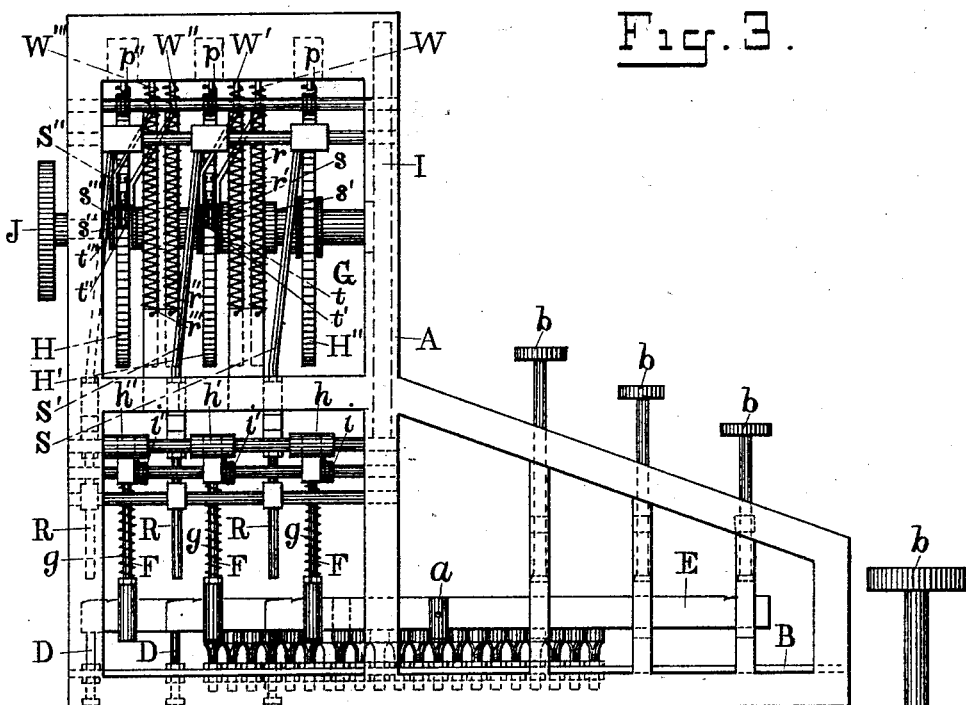
Figure 4:
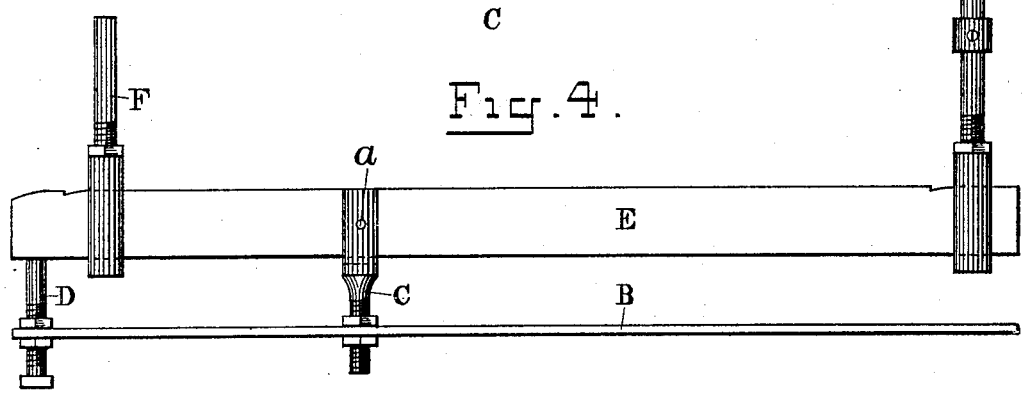
Figure 5:
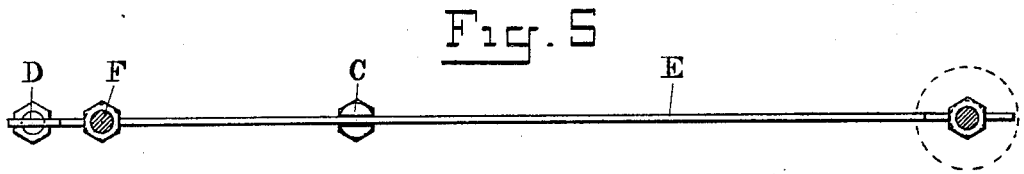
Figure 6:
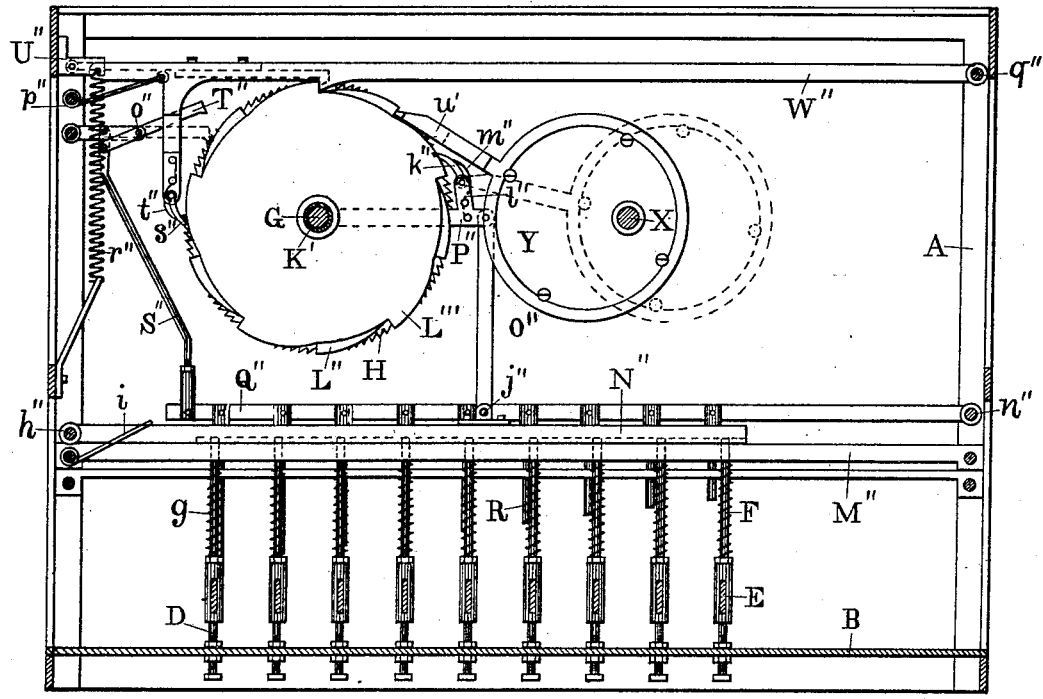
Figure 7:
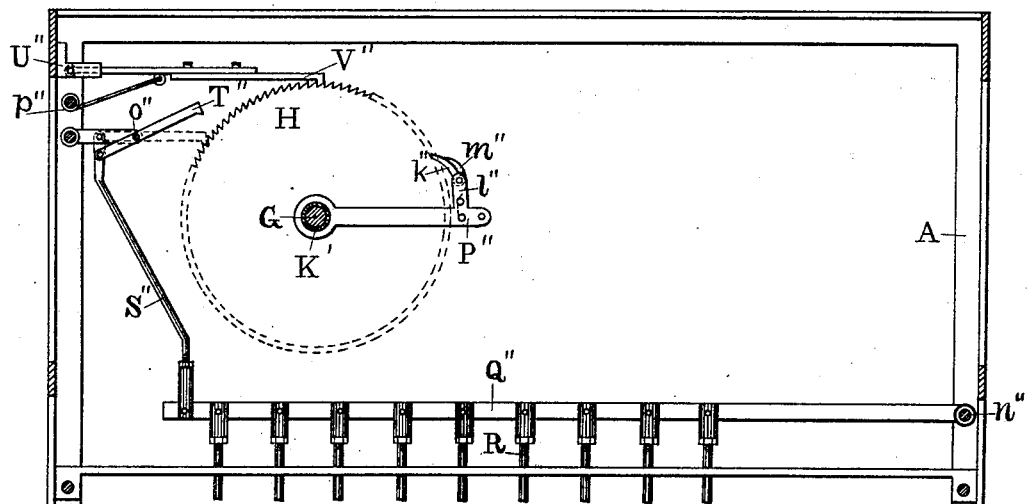

Figure 1, is a top view of the frame and the interior mechanism of my improved adding machine. Fig. 2, is a vertical front view of the machine from the keyboard up, part of the outside cover broken away; to show the numbers on the index wheels. Fig. 3, is a vertical end view of the frame and the interior mechanism of the machine. Fig. 4, is an enlarged side view of one of the key levers, the key-lever pivot post, and key support. Fig. 5, is a top view of the same. Fig. 6, is a vertical cross section taken on the line $a.\ b$ of Fig. 1. Fig. 7, is a vertical cross section of the upper part of the machine on the line $c.\ d$ of Fig. 1. Fig. 8, is an enlarged sectional view of the main shaft, the hollow sleeves, the toothed wheels, and index wheels through the center. Fig. 9, is an enlarged sectional view of the setting shaft and eccentrics on the same through the center.

Similar letters and figures refer to similar parts throughout the several views.

Referring to the drawings, A indicates a suitably constructed frame, covered on the outside with any suitable metallic sheet material. The frame A is provided with a metallic bottom B, to which is attached by nuts a series of adjustable key lever pivot posts C. A series of adjustable lever rests D is attached to the bottom in the same manner. Pivoted in the lever posts C at ($a$), is a series of key levers E provided at one end with a series of numbered keys ($b$), the levers are provided at their inner ends, with a series of lifting pins F more fully described hereinafter.

In the frame A, I journal a main shaft G, a toothed wheel H is secured on the shaft near the back end, the said wheel having one hundred teeth on its outer rim. On the front end of the shaft G, I secure a numbered index wheel I provided with two rows of numbers, the outside row ($d$) representing hundreds numbered from 0 to 9 ten consecutive times in ten equal spaces, the inside row ($e$) representing thousands numbered from 0 to 9 in ten equal spaces, the first space blank, the second space having the number 1 ten consecutive times, the third space having the number 2 ten consecutive times, and continuing in the same manner until all the spaces are filled, the tenth space having the number 9 ten consecutive times. The shaft G is provided at its back end outside the frame with a setting wheel J, the rotation of the setting wheel by the fingers, turns the index wheel at the opposite end of the shaft and sets the index at 0 in the index window (*f*) when necessary.

The main shaft G is provided with a hollow sleeve K, the sleeve having secured on it two ratchet wheels L, L', the wheels having five teeth to the wheel, a toothed wheel H having one hundred teeth on the rim, is also secured on the sleeve. The front end of the sleeve K is provided with an index wheel I' representing tens, it is numbered from 0 to 9 ten consecutive times, in ten equal spaces.

A hollow sleeve K' is placed over the sleeve K, the sleeve K' has secured on it two ratchet wheels L'' L''' having five teeth to the wheel, a toothed wheel H'' having one hundred teeth on the rim, is also secured on the sleeve K'. The front end of the sleeve K' is provided with an index wheel I'' representing numerals, it is numbered from 0 to 9 ten consecutive times, in ten equal spaces.

Secured to the side frames, are three guide bars M. M' M'' in which a series of lifting pins F operate, the said lifting pins are attached to the ends of the key levers E, the pins are provided with a series of springs (*g*), the springs placed on the pins between the guide bars and the key levers to keep the levers pressed down on the lever rests. Above the guide bars, are placed lifting bars N N' N'', the said bars pivoted at one end to the frame A at (*h. h. h.*), the lifting bars are provided with a groove shown by a dotted line, the points of the lifting pins F operating in the groove. Pivoted on the lifting bars at (*j. j. j.*) are vertical connecting rods O. O' O'', the rods pivoted at their upper ends to pawl levers P P' P'', the pawl levers are made in the form of a U, and are pivoted at their inner ends on the main shaft G.

The pawl levers P P' P'', are provided with pawls (*k. k. k.*) pivoted in vertical lugs (*l. l. l.*), the said pawls operating in the teeth of the wheels H H' H'', the pawls are kept in contact with the wheels by springs (*m. m. m.*). It will be readily understood, the pressing down of the operating key levers, will lift the inside end of the lever and elevate the lifting bar, the connecting rod to the pawl lever being elevated by the same movement, will rotate the toothed wheel, the space of one or more teeth, in proportion to the amount of the lift given to the lifting bar. The pivot posts C being set at unequal distances from the front end of the levers, give the lift for the proper number of teeth in the wheel to correspond to the number on the key operated.

An additional set of lifting bars Q. Q' Q'' is pivoted to the side frame at (*n. n. n.*), they are provided with a series of depending pins R, the said pins made of unequal lengths as shown. On the upper side of the bars, are connecting rods S S' S'', the rods pivoted at their upper ends to stop pawls T T' T'', the said stop pawls pivoted at (*o. o. o.*) to projecting brackets on the frame.

The key levers when operated, come in contact with the depending pins and lift the levers, the lifting of the levers brings the stop pawls to place in the toothed wheels, preventing the wheels from rotating beyond the requisite number of teeth, by the motion or momentum of the moving parts.

Secured to the upper part of the frame, are brackets U U' U'' having pivoted in them adjustable holding pawls V V' V'', the said pawls held in place in the teeth of the wheels H H' H'', by springs (*p*) one of them shown in Fig. 7. The pawls prevent the toothed wheels from turning backward, by the friction of the lifting pawls when operated.

A series of levers W W' W'' W''' is pivoted in the frame at (*q. q' q'' q'''*), the said levers having a wedge shaped enlargement on the under side, the wedge shaped enlargement resting on the ratchet wheels L. L' L'' L''', the levers having coiled springs (*r. r' r'' r'''*) to keep the levers in contact with the wheels. The levers W. W' W'' W''' are provided with depending arms having ratchet pawls (*s. s' s'' s'''*) pivoted to their ends, the pawls held to place in contact with the wheels H. H' by springs (*t. t' t'' t'''*).

In the operation of the machine when one of the toothed wheels makes more than one tenth of a revolution, one of the levers dropping from the tooth of the adjoining ratchet wheel, will advance the next toothed wheel one tooth, thereby raising the index number in the next column one number. For instance if the indexes were all at naughts in the index window, and the unit key 8 was pressed down twice in succession, it would show six in the unit column, and the next highest being advanced one by the action of the lever on the ratchet wheel, would show one in the ten column, or a total of sixteen as the sum of twice eight. A setting shaft X is journaled in the frame, it has eccentric disks Y. Y' secured to the shaft, the disk having loose rims with adjustable arms (*u. u'*) operating on the outer edges of the disks, the arms are provided with T heads on the outer ends, the heads resting against the ratchet wheels on the sleeves of the main shaft. The shaft X is provided on its back end outside of the frame with a setting wheel J'. When it is necessary to set the index at 0, the setting wheel J' is turned by the fingers, the rotation of the shaft operating the eccentric arms against the ratchet wheels, rotates the ratchet and index wheels until the naughts appear at the index window (*f*). The rotation of the main shaft, by the setting wheel J, attains the same result on the index wheel, carrying the two inside rows of figures.

The machine as shown in the drawings, is provided with only three rows of keys, and four rows of figures, but as can readily be seen, the same principle can be extended to any higher number desired by duplicating the same devices of operation. I do not confine myself to the number of keys shown, but reserve the right to increase the rows of keys and figures on index wheels, without departing from the spirit of my invention.

Having thus described my invention, what I claim as new, and desire to secure by Letters Patent, is—

1. In an adding machine, the combination with a main shaft, journaled in the frame and having a toothed wheel and an indicating disk fast thereon, and sleeves loosely mounted thereon each having a toothed wheel, two ratchet wheels, and an indicating disk rigid therewith, of a series of levers pivoted to the frame and having wedge shaped projections in contact with the ratchet wheels, and pawls in contact with the adjoining toothed wheels, and a series of key-levers each having a lifting pin, and operating a series of lifting bars pivoted to the frame and connected with levers carrying spring pressed pawls operating the toothed wheels, substantially as and for the purpose described.

2. In an adding machine, the combination with a main shaft, journaled in the frame and having a toothed wheel and an indicating disk fast thereon, and sleeves loosely mounted thereon each having a toothed wheel, two ratchet wheels, and an indicating disk rigid therewith, of a series of lifting bars pivoted to the frame and having a series of depending pins of unequal lengths, the lifting bars connected to stop pawls pivoted to the frame and the pawls adapted to engage the toothed wheels placed opposite them on the main shaft or on the sleeves, each of the series of pawls and toothed wheels operated by a separate series of key-levers, substantially as described.

3. In an adding machine, the combination with a main shaft, journaled in the frame and having a toothed wheel and indicating disk fast thereon, and sleeves loosely mounted thereon each having a toothed wheel, two ratchet wheels, and indicating disk rigid therewith, of a setting shaft journaled in the frame and having a setting wheel and two eccentrics fast thereon, rims on the eccentrics having arms in contact with the ratchet wheels on the sleeves, the rotation of the setting shaft rotating the ratchet wheels and indicator disks for setting, substantially as and for the purpose described.

4. In an adding machine, the combination with a main shaft, journaled in the frame and having a toothed wheel and indicating disk fast thereon, and sleeves loosely mounted thereon each having a toothed wheel, two ratchet wheels, and an indicating disk rigid therewith, of a series of key-levers pivoted in posts attached to the frame, the inner end of levers supported by adjustable posts, each lever having a lifting pin operating a series of lifting bars pivoted to the frame and connected with levers carrying spring pressed pawls in contact with the toothed wheels, substantially as described.

In testimony whereof I affix my signature in presence of two witnesses.

JOHN PRICE ROYALL.

Witnesses:
F. D. HUBBELL,
ROLLINS M. HOCKADAY.